United States Patent
Kumar et al.

(10) Patent No.: US 8,868,567 B2
(45) Date of Patent: Oct. 21, 2014

(54) INFORMATION RETRIEVAL USING SUBJECT-AWARE DOCUMENT RANKER

(75) Inventors: Girish Kumar, Kirkland, WA (US); Alfian Tan, Issaqua, WA (US); Nicholas Eric Craswell, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 6 days.

(21) Appl. No.: 13/019,696

(22) Filed: Feb. 2, 2011

(65) Prior Publication Data
US 2012/0197905 A1    Aug. 2, 2012

(51) Int. Cl.
*G06F 17/30* (2006.01)
*G06F 17/27* (2006.01)

(52) U.S. Cl.
CPC ........ *G06F 17/2785* (2013.01); *G06F 17/3053* (2013.01); *G06F 17/279* (2013.01)
USPC ........................................................ 707/748

(58) Field of Classification Search
CPC ............................... G06F 17/30; G07F 17/053
USPC .......... 707/729, 722, 748, 708, 728, 752, 765, 707/768
See application file for complete search history.

(56) References Cited

U.S. PATENT DOCUMENTS

| | | | | |
|---|---|---|---|---|
| 5,418,951 | A * | 5/1995 | Damashek | 1/1 |
| 6,675,159 | B1 | 1/2004 | Lin | |
| 8,019,748 | B1 * | 9/2011 | Wu et al. | 707/713 |
| 2004/0186828 | A1 | 9/2004 | Yadav et al. | |
| 2004/0186831 | A1 | 9/2004 | Hiratsuka et al. | |
| 2006/0074903 | A1 * | 4/2006 | Meyerzon et al. | 707/5 |
| 2006/0212441 | A1 | 9/2006 | Tang et al. | |
| 2007/0038608 | A1 | 2/2007 | Chen | |
| 2008/0222133 | A1 * | 9/2008 | Au et al. | 707/5 |
| 2009/0198674 | A1 | 8/2009 | Custis | |
| 2009/0281900 | A1 | 11/2009 | Rezaei | |
| 2009/0313236 | A1 | 12/2009 | Hernacki et al. | |
| 2010/0094835 | A1 * | 4/2010 | Lu et al. | 707/705 |

OTHER PUBLICATIONS

Bendersky, Michael, et al., Discovering Key Concepts in Verbose Queries—Published Date: 2008 http://maroo.cs.umass.edu/pdf/IR-651.pdf.
Bendersky, Michael, et al., Learning Concept Importance Using a Weighted Dependence Model—Published Date: 2010 http://www.wsdm-conference.org/2010/proceedings/docs/p31.pdf.
Shehata, Shady, et al., An Efficient Concept-Based Mining Model for Enhancing Text Clustering—Published Date: 2009 http://ieeexplore.ieee.org/stamp/stamp.jsp?tp=&arnumber=5184843.
Singh, Shailendra, et al., Rough Set Based Concept Extraction Paradigm for Document Ranking—Published Date: 2010 http://www.springerlink.com/content/80112p008446302j/.
International Search Report and Written Opinion in PCT/US2012/023685, mailed Jul. 30, 2012.

* cited by examiner

*Primary Examiner* — Hosain Alam
*Assistant Examiner* — Johnese Johnson
(74) *Attorney, Agent, or Firm* — Dave Ream; Doug Barker; Micky Minhas (57) ABSTRACT

Subject matter described herein is related to determining a document score, which suggests a relevance of a document (e.g., webpage) to a search query. For example, a search query is received that is comprised of one or more terms, which represent a subject. An equivalent subject is identified that is semantically similar to the subject. The document score is determined by accounting for both a subject frequency and an equivalent-subject frequency.

16 Claims, 4 Drawing Sheets

INFORMATION RETRIEVAL USING SUBJECT-AWARE DOCUMENT RANKER

BACKGROUND

A document ranker evaluates documents to determine relevance of the documents to a search query. Often, a ranker does not adequately account for search queries that include multiple subjects (also referred to as "concepts"), each of which are comprised of a set of keywords. That is, often a ranker will treat keywords independent of one another, instead of considering how keywords combine to form subjects or topics of interest within a same search query. In addition, a ranker often fails to adequately account for semantically similar keywords or subjects, such as synonyms and alternative spellings, that might be included within a document.

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, determining a document score, which suggests a relevance of a document to a search query. For example, a search query is received that is comprised of one or more terms, which represent a subject. For each subject, one or more equivalent subjects might be identified which are semantically similar to the subject. The document score is determined by accounting for both a subject frequency and an equivalent-subject frequency. For example, a scoring function might rank balanced documents higher by penalizing a document that completely fails to represent a query subject or any of its equivalent subjects.

BRIEF DESCRIPTION OF THE DRAWINGS

Illustrative embodiments of the present invention are described in detail below with reference to the attached drawing figures, wherein.

DETAILED DESCRIPTION

The subject matter of select embodiments of the present invention is described with specificity herein to meet statutory requirements. But the description itself is not intended to define what is regarded as the invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Subject matter described herein is related to determining a document score, which suggests a relevance of a document to a search query. For example, a search query is received that is comprised of one or more terms that represent a subject. An equivalent subject is identified that is semantically similar to the subject. The document score is determined by accounting for both a subject frequency and an equivalent-subject frequency. The document score might be determined using a search engine having a ranker, both of which include a computing device.

Figure 1:
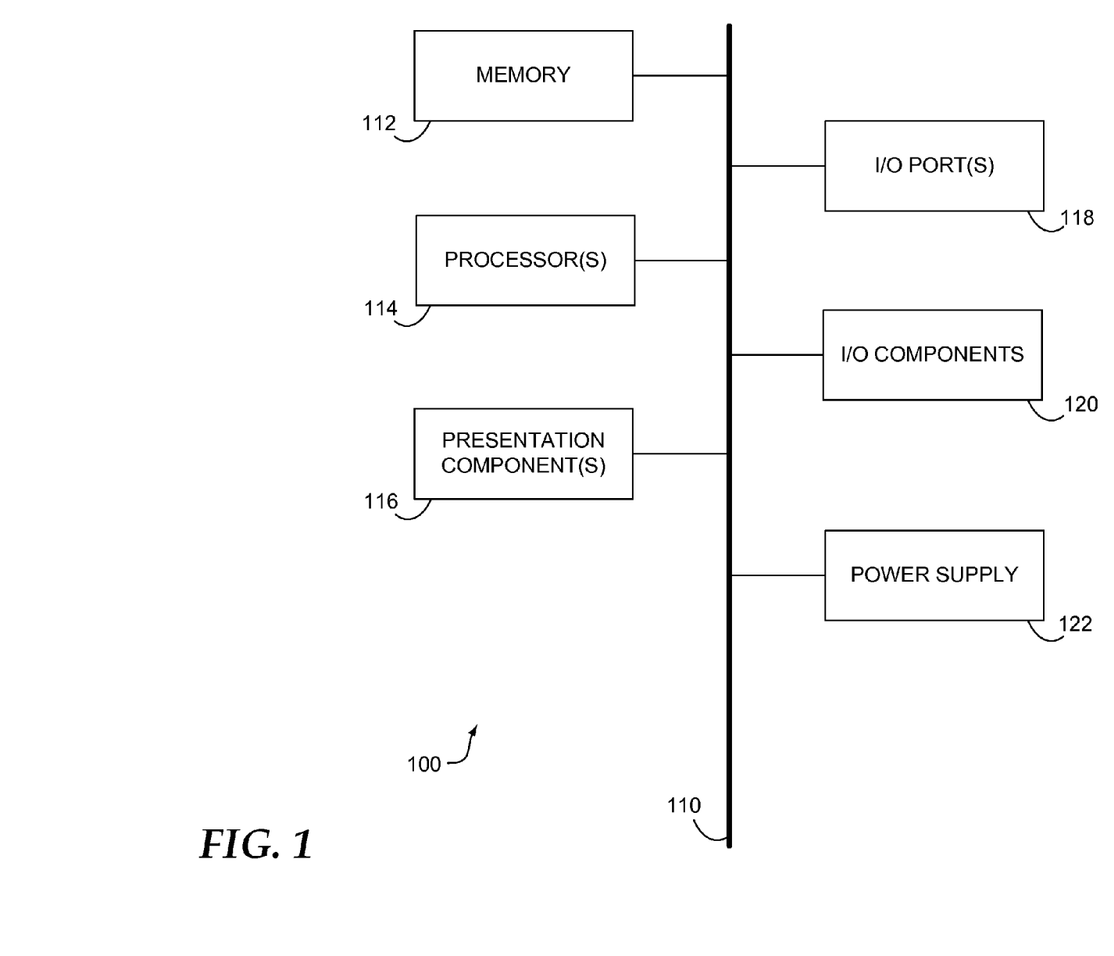
FIG. 1 depicts an exemplary computing environment in accordance with an embodiment of the present invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention might be practiced in a variety of system configurations, including hand-held devices, consumer electronics, general-purpose computers, more specialty computing devices, etc. Embodiments of the invention might also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what might be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one might consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EEPROM; flash memory or other memory technology; CD-ROM; digital versatile disks (DVD) or other optical disk storage; magnetic cassettes, magnetic tape, magnetic disk storage or other magnetic storage devices; or other medium which can be used to store the desired information and which can be accessed by computing device 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 112 includes computer-storage media in the form of volatile and/or nonvolatile memory. The memory might be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which might be built in. Illustrative components include a microphone, joystick, game pad, satellite dish, scanner, printer, wireless device, etc.

Figure 2:
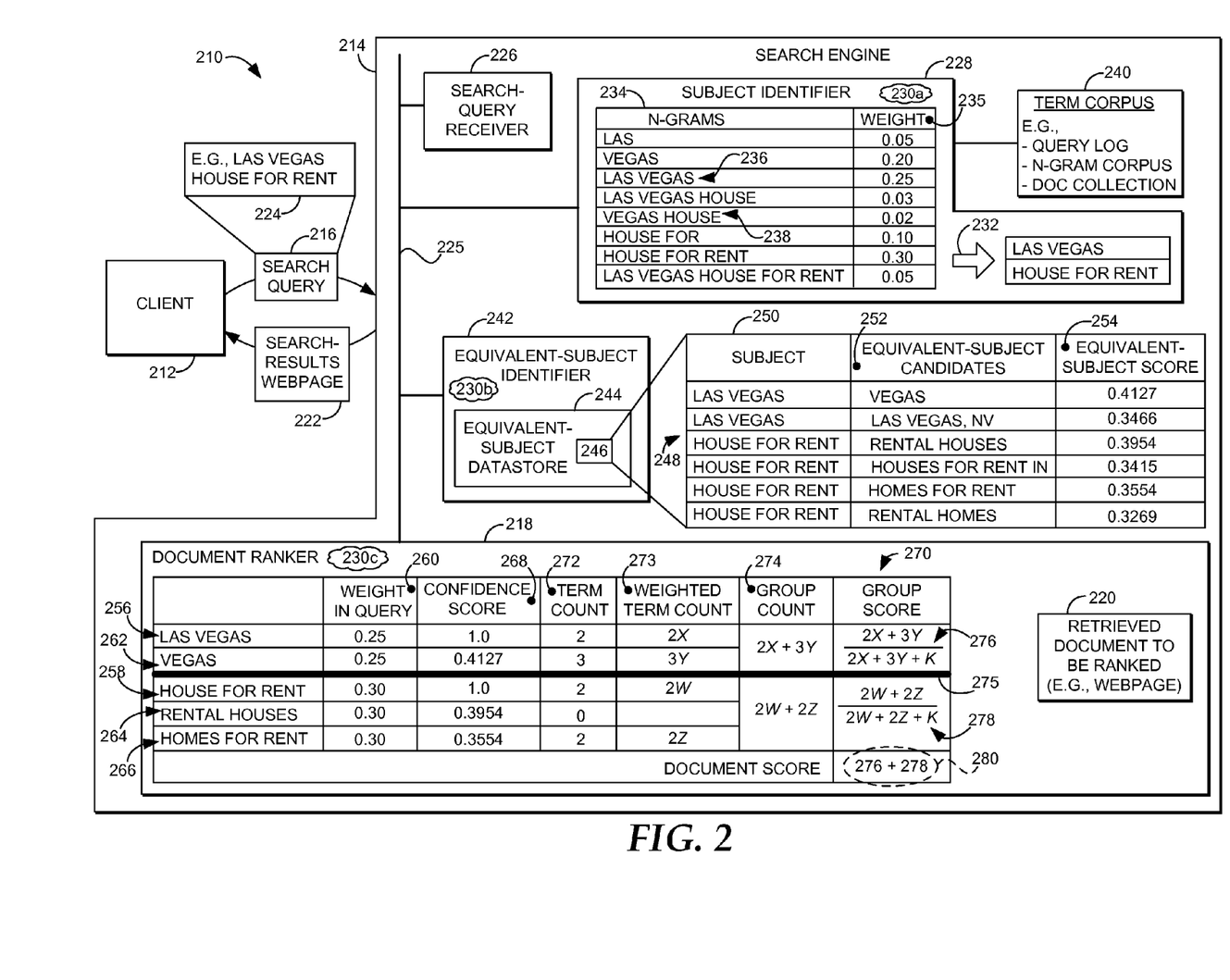
FIG. 2 depicts another exemplary computing environment in accordance with an embodiment of the present invention.

Referring now to FIG. 2, another exemplary computing environment is depicted that is generally identified by reference numeral 210. Environment 210 includes a client computing device 212 and a search engine 214. Both client 212 and search engine 214 might include some or all of the components described with respect to FIG. 1, such as a processor and computer-readable media. For example, search engine 214 includes computer-readable media 230a-c having computer-executable instructions embodied thereon that, when executed, perform a method of determining a document score, which suggests a relevance of a document to a search query.

In one embodiment, client 212 submits a search query 216 (e.g., las vegas house for rent) to search engine 214. Search engine 214 determines a document score 280 of a document 220 (e.g., webpage or any other document available by way of a network), the document score 280 suggesting a relevance of document 220 to search query 216. That is, search engine 214 includes various components, such as a search-query receiver 226, subject identifier 228, equivalent-subject identifier 242, and document ranker 218 that communicate by way of a connection 225. As will be described in more detail below, these components 226, 228, 242, and 218 communicate with one another to determine document score 280. Document score 280 can be used to compile a search-results webpage 222, which is provided to client 212.

Search engine 214 includes a search-query receiver 226 that receives search query 216. Search query 216 is depicted in an exploded view 224, which depicts that an exemplary search query includes "las vegas house for rent." For explanatory purposes, the exemplary search query "las vegas house for rent" is referenced throughout this disclosure. Search-query receiver 226 might receive search query 216 by way of a network, such as the Internet.

Search-query receiver 226 communicates with subject identifier 228. Subject identifier 228 includes computer-readable media 230a that, when executed, identifies subjects included in search query 216. As used herein, the term "subject" refers to a term or a group of terms within a search query that form a distinct concept. For example, arrow 232 depicts that subject identifier 228 identifies two subjects within the search query "las vegas house for rent." That is, subject identifier 228 identifies both "las vegas" and "house for rent" as two distinct concepts.

Subject identifier 228 might identify subjects using a variety of techniques. For example, subject identifier 228 might divide search query 216 that was received into various n-grams. Exemplary n-grams are depicted in table 234 that might be generated from exemplary search query "las vegas house for rent." That is, search query 216 might be divided into various unigram, bigram, trigram, etc. combinations that are present among the search terms of search query 216. Table 234 depicts that exemplary n-grams include "las," "vegas," "las vegas," "las vegas house," etc.

N-grams depicted in table 234 include various degrees of relative importance to search query 216. For example, the subject "las vegas" is likely more important to search query 216 than the n-gram "vegas house" or "house for." As such, subject identifier 228 might determine relative importance of each n-gram by generating a weight of each n-gram. The weight quantifies a measured importance of the n-gram, and exemplary weights are listed in column 235 of table 234. N-gram weights might be determined using various techniques. For example, subject identifier 228 might reference a term corpus 240 to obtain n-gram-frequency data of each n-gram. Term corpus 240 might include various term sources, such as query logs, n-gram listings, and document collections.

N-gram-frequency data might be used in various manners to determine a respective weight of each n-gram. In one embodiment, relatively uncommon unigrams with lower frequency counts might be weighted higher relative to other n-grams in a search query. For example, "vegas" might have lower frequency counts than other unigrams ("las," "house," "for," and "rent"), thereby indicating that "vegas" is a more relevant subject within the search query "las vegas house for rent."

However, when weighting bi-grams, tri-grams, and other sequences having more than one term, higher frequency counts might be used to assign a higher n-gram weight. Such a weighting scheme is based on an assumption that relatively uncommon or rare n-grams having more than one term might be nonsensical, or might otherwise not be very relevant to the search query. For example, the n-gram "vegas house" might have a lower frequency count than "las vegas" suggesting that it is not as relevant in the context of the query "las vegas house for rent."

Other considerations might be taken into account when weighting n-grams having more than one term. For example, multi-term n-grams including terms that individually have relatively high frequency counts (e.g., "what if") might be weighted lower. As such, n-gram frequency is taken into account, as well as term frequency. Likewise, an n-gram that is included in a larger relevant n-gram might be assigned a lower weight. For example, "house for," which likely has a relatively high frequency, might be assigned a lower weight because "house for" is also in the relevant n-gram "house for rent," which likely also has a relatively high frequency. Such a weighting scheme is based on an assumption that it might be less useful to match a smaller n-gram in a document by itself (i.e., when ranking the document) when the smaller n-gram is part of a bigger relevant n-gram.

Accordingly, a "subject" might be defined as all n-grams that are created from a search query, in which case a respective weight assigned to each n-gram determines how important the n-gram is when ranking a document. Alternatively, n-grams that are taken into account when ranking a document might only include n-grams having a weight that satisfies one or more criteria. For example, a criterion might require that an n-gram have a weight in a top threshold percentage (e.g., 25%) of all n-grams created from a search query. Another criterion might require that an n-gram have a weight in the top threshold number (e.g., five) of all n-grams created from a search query. Another criterion might require that an n-gram have a weight above a threshold in order to be considered when ranking a document. In a further embodiment, n-gram weights of n-grams created from a same search query are normalized, such as by adjusting the n-gram weights to add up to a value of one.

Once subjects (e.g., "las vegas" and "house for rent") have been identified in search query 216, equivalent-subject identifier 242 is used to identify equivalent subjects. For example, equivalent-subject identifier 242 includes computer-readable media 230b having computer-executable instructions embodied thereon that, when executed, identify equivalent subjects. As used herein, an "equivalent subject" describes a term or phrase that is semantically similar to an identified subject. Examples of equivalent subjects include synonyms, re-ordered-word phrases, and alternative spellings. FIG. 2 depicts that equivalent-subject identifier 242 includes an equivalent-subject datastore 244, which includes information 246. Information 246 is depicted in an exploded view 248 for illustrative purposes, the exploded view 248 including a table 250 of subjects and equivalent-subject candidates. Accordingly, to identify an equivalent subject of "las vegas" or "house for rent," equivalent-subject identifier 242 might reference datastore 244.

Equivalent subjects might be generated using various techniques. For example, a random-walk model might be applied to find semantically related pairs of queries in a large query log. Aligning those query pairs and aggregating the data can identify promising equivalent subjects. Table 250 includes column 252, which includes equivalent-subject candidates that might be generated. Such techniques might also generate an equivalent-subject score, which suggests a measure of confidence that the equivalent-subject candidate is semantically similar to the subject. Table 250 includes column 254, which includes equivalent-subject scores of each of the listed equivalent-subject candidates.

The equivalent-subject score 254 might be generated based on many semantically related query pairs from a large log. As indicated above, the query-to-query semantic relationship may be established via a random walk on the click graph or via observing user reformulation patterns. For example, we might find many query pairs of the form <'X house for rent', 'X rental houses'> (e.g., "Las Vegas house for rent" and "Las Vegas rental houses") for many values of X, thereby leading to a strong equivalent-subject score for subject 'house for rent' having an equivalent subject 'rental houses'.

However, the query-to-query dataset might have noisy occurrences such as <'X house for rent', 'X mortgage loan'>, since sometimes the random walk or session reformulations exhibit a drifting intent. For this reason, it is important to consider multiple features in addition to the mere existence of a query-to-query relationship when determining the equivalent-subject score. Examples of other features include the number of contexts (i.e., values of X) that suggest a query-to-query relationship, the strength of each query-to-query association, and whether the subject and equivalent-subject have roughly equivalent frequency in the logs. That is, if one query is significantly more frequent than another query it is usually an indication that the equivalency is bad. For example 'apple' and 'apples' might not be good equivalents if the query {apple ipod} is significantly more frequent than {apples ipod}. It is also useful to prefer alternate subjects that tended to occur in "successful" queries, which had a high click through rate and occur near the end of a session. A simple linear combination of these features gives our equivalent-subject score.

Equivalent-subject identifier 242 might filter equivalent-subject candidates based on scores. That is, when passing information to document ranker 218, equivalent-subject identifier might only identify equivalent subjects having a confidence score that satisfies one or more criteria. For example, a criterion might require that an equivalent subject have a confidence score in a top threshold percentage (e.g., 25%) of all equivalent subjects identified for a subject. Another criterion might require that an equivalent subject have a confidence score in the top threshold number (e.g., five) of all equivalent subjects identified for a subject. Another criterion might require that an equivalent subject have a confidence score above a threshold value in order to be considered when ranking a document.

Document ranker 218 uses information provided by subject identifier 228 and equivalent-subject identifier 242 to measure a document's relevance to search query 216. Exemplary information provided by subject identifier 228 includes a list of subjects that are deemed to be included within search query 216. For example, subject identifier 228 provides information indicating that "las vegas" 256 and "house for rent" 258 are included within search query 216. In addition, subject identifier 228 provides a respective weight for each identified subject, the respective weight suggesting how important the subject is in the context of search query 216. Column 260 of table 270 lists exemplary weights that might be provided by subject identifier 228.

Exemplary information provided by equivalent-subject identifier 242 includes a list of equivalent subjects that are deemed semantically similar to each subject of search query 216. For example, equivalent-subject identifier 242 might provide information indicating that "vegas" 262 is an equivalent subject that is semantically similar to "las vegas" 256 and that "rental houses" 264 and "homes for rent" 266 are semantically similar to "house for rent" 258. Further, equivalent-subject identifier 250 might provide a score, which suggests a measure of confidence that an equivalent subject is semantically similar to a subject. Column 268 lists exemplary scores that might be provided by equivalent-subject identifier 242. In one embodiment, subjects are assigned a measure of confidence of one (e.g., 100%), and an equivalent subject is assigned a same weight as the subject to which the equivalent subject is believed to be semantically similar.

Document 220 is retrieved, and ranker 218 evaluates the relevance of document 220 to search query 216 by considering a variety of factors. For example, ranker 218 determines a number of times each subject 256 and 258 and equivalent subject 262, 264, and 266 is found in document 220. A value that represents a number of times a subject or equivalent subject is found in a document might be referred to herein as a subject frequency or an equivalent-subject frequency (respectively). In addition, table 270 includes a column 272 labeled "term count," which describes a number of times a term (i.e., a subject or equivalent subject) is found in a document. That is, "term" is used herein as a generic description that includes both "subject" and "equivalent subject." A subject or equivalent subject might be found in various portions of a document, such as in a title, a heading, or a body of document 220.

Additional factors might be taken into account by ranker 218 that are used to generate a weighted term count included under column 273 of table 270. Some factors are based on locations within document 220 at which a term is found. One factor includes "term-location importance," which weights a hit or frequency count based on a prominence of a location (e.g., title or body) within document 220 at which a term is found. For example, a hit in a title or heading of document 220 might be weighted more than a hit in the body of document 220. Another factor includes "term dispersal," which weights a frequency count based on the extent to which term inclusion within a document is dispersed throughout document 220. For example, a term count that reflects hits spread evenly throughout a document (i.e., from the beginning of the document to the end of the document) might be weighted more than concentrated hits (e.g., hits that are located within a single paragraph of document 220).

Other factors might also be taken into account when deciding how to weight a term count. For example, the weight of a term (i.e., weight under column 260) relative to other terms in a query might be taken into account. In addition, the confidence score (i.e., score under column 268) might also be taken into account. As such, values included under column 260 and/or column 268 might be applied to values included under column 272 to determine a weighted term count under column 273. Each of the variables X, Y, W, and Z are included in column 273 to represent the various factors that might be used to weight a term count.

When evaluating document 220, ranker 218 combines a subject (e.g., las vegas) with respective equivalent subjects to create a subject group. Table 270 includes a larger grid line 275, which depicts a first subject group "las vegas" and a second subject group "house for rent." Accordingly, term counts or weighted term counts are combined within a subject group to determine a group count, which is depicted under column 274 of table 270. For example, term counts of both "las vegas" and "vegas" might be combined to generate a group count for the "las vegas" subject group. Likewise, weighted term counts (i.e., term counts that are weighted based on term-location importance and term dispersal) might be combined to generate a group count. Accordingly, when weighted term counts are combined to generate a group count, the group count might reflect a term count, term-location importance, term dispersal, weight (i.e., under column 260), confidence (i.e., under column 268), or a combination thereof. If no weight is applied to term counts, the variables (e.g., X, Y, W, and Z) under column 273 could be set to a value of one. The term "group count" is also referred to herein as "subject-group frequency."

Ranker 218 applies a function to the group count to determine a group score of each subject group. Accordingly, in one embodiment, the group score is equal to the group count divided by the sum of a customizable parameter and the group-count score. This function is sometimes referred to as a saturation function. The function can be established under a 2-Poisson assumption as in the well-known ranking function BM25, although in BM25 the function is used at the word level rather than the subject level. The function has been proven empirically to be highly effective, but the most important property is that of diminishing returns: for each subject we give the most credit for the initial occurrences, so weighted term count of 10 is much better than 0, but 1010 is almost identical to 1000. The "k" parameter controls the saturation and can be set empirically based on whatever value gives you the best ranking of documents In addition, ranker 218 combines each group score of each subject group included in a search query. For example, ranker 218 combines group score 276 of the subject group "las vegas" with group score 278 of the subject group "house for rent" to generate a document score 280. Document score 280 of document 220 can then be compared to other documents scores of other documents (not shown) to determine how document 220 should be ranked among the other documents when generating search-results webpage 222.

Ranker 218 might apply various techniques to determine how various factors should be taken into account, such as term count, term-location importance, term dispersal, weight (i.e., under column 260), confidence (i.e., under column 268), document quality or a combination thereof. For example, a virtual machine might be trained using training documents and training search queries for which the various factors have been determined. Accordingly, once the various factors have been determined with respect to search query 216 and document 220, the various factors can be submitted to the virtual machine to determine a document score.

Figure 3:
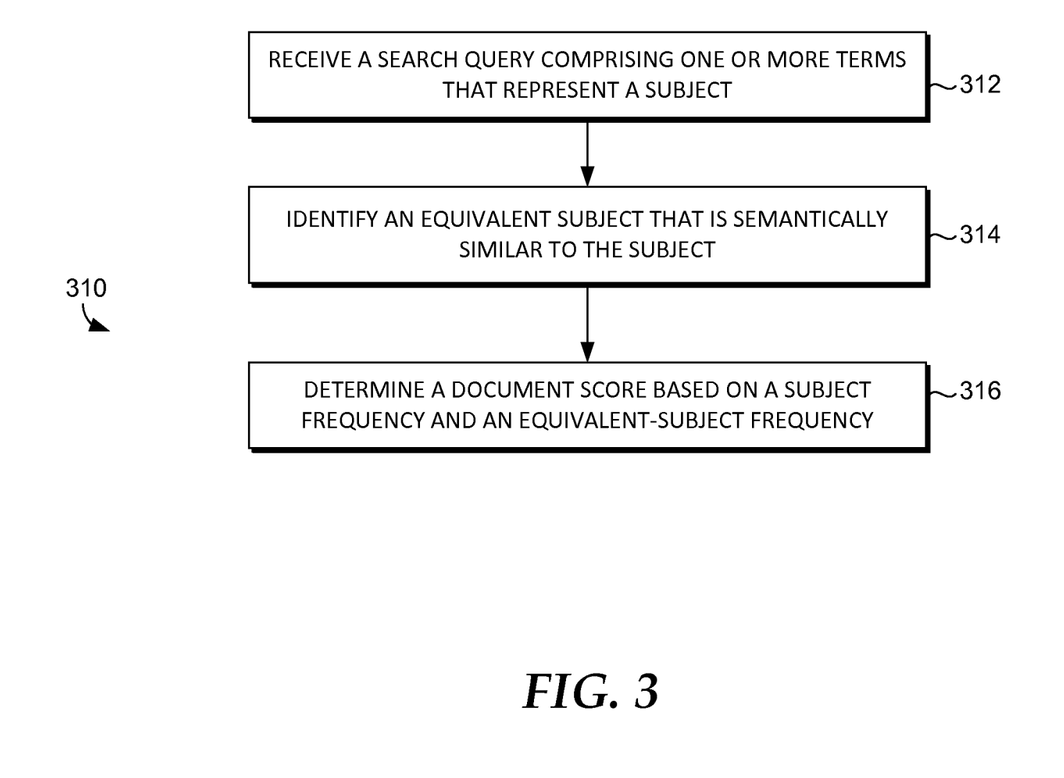
FIGS. 3 and 4 include flow diagrams that depict a method in accordance with an embodiment of the present invention.

Now referenced is FIG. 3, which depicts a method 310 in accordance with an embodiment of the present invention. When describing FIG. 3, reference might also be made to FIG. 2. For example, FIG. 3 is directed to determining a document score (e.g., 280), which suggests a relevance of a document (e.g., 220) to a search query (e.g., 216). An embodiment of the present invention includes computer-readable media (e.g., 230*a-c*) having computer-executable instructions embodied thereon that, when executed, perform the method depicted by FIG. 3.

Step 312 of method 310 includes receiving a search query comprising one or more terms that represent a subject. For example, search-query receiver 226 receives search query 216 that is comprised of the subject "las vegas" and the subject "house for rent," each of which is a separate subject. As described with respect to subject identifier 226, subjects might be identified by applying various techniques. For example, n-grams (e.g., in table 234) might be generated and weighted based on frequency data generated from term corpus 240. All generated n-grams might be considered as subjects, or alternatively, only those n-grams having weights that satisfy criteria are selected as subjects.

Step 314 of method 310 includes identifying an equivalent subject that is semantically similar to the subject, wherein the subject and the equivalent subject comprise a subject group. For example, subject identifier 242 references datastore 244, which maintains a listing of equivalent-subject candidates (e.g., under column 252). As such, for the subject "house for rent," equivalent subjects that might be identified include "rental houses" and "homes for rent." As depicted in table 270, line 275 indicates that the subject "house for rent" and the equivalent subjects "rental houses" and "homes for rent" are included in a subject group, which is distinct from a subject group that includes "las vegas" and "vegas."

In method 310, step 316 includes determining the document score of the document. The document score is comprised of a subject-group score, and the subject-group score is calculated using both a subject frequency and an equivalent-subject frequency. The subject frequency includes a number of times the subject is found in the document, and the equivalent-subject frequency includes a number of times the equivalent-subject is found in the document. Referring to FIG. 2, ranker 218 determines document score 280, which suggests a relevance of document 220 to search query 216. Document score 280 is calculated using subject-group score 276 and 278. Each subject-group score 276 and 278 is calculated using both a subject frequency and equivalent subject frequency, which is listed under column 272 labeled "term count." "Term" (as used in table 270) is descriptive of both a subject 256 and an equivalent subject 262, such that "term count" refers to a frequency or number of times a subject or equivalent subject is found in document 220.

Figure 4:
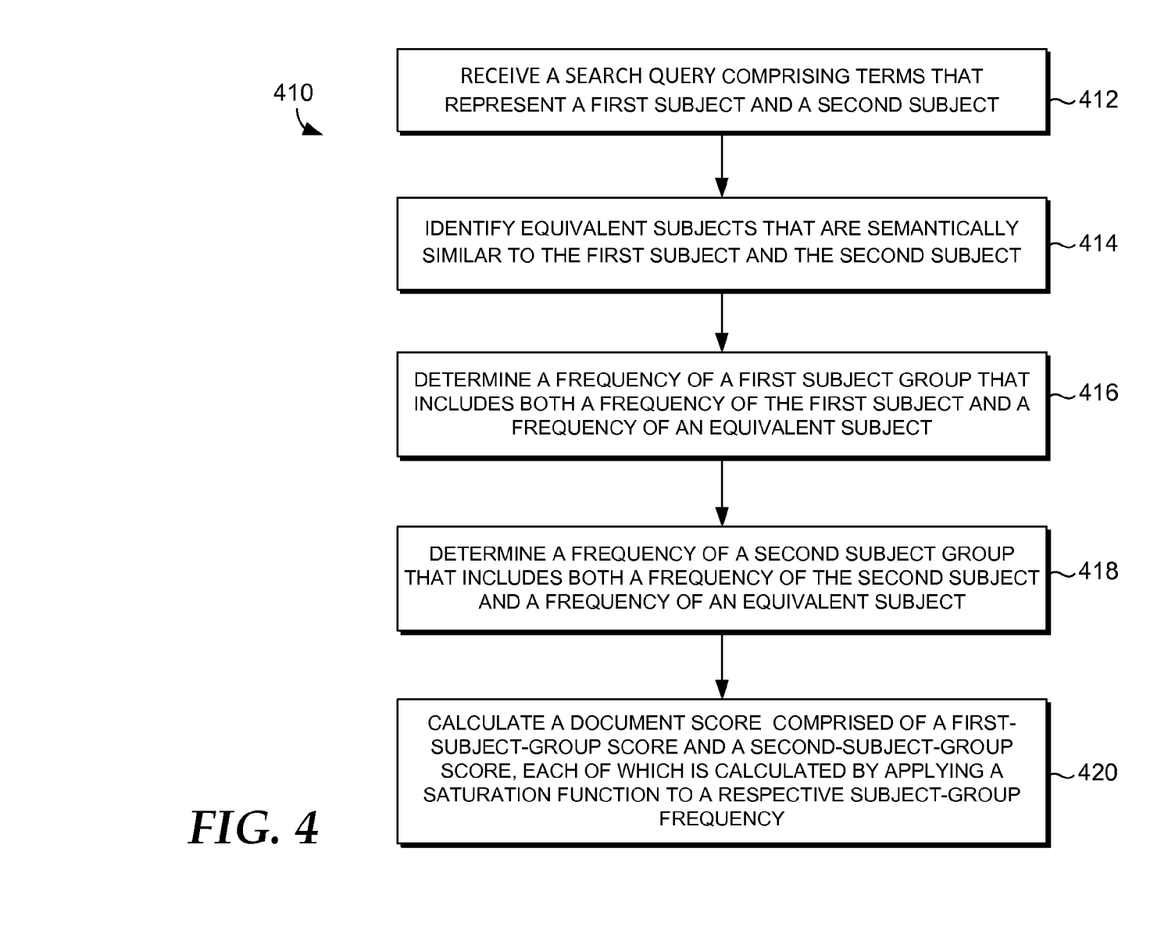

Now referenced is FIG. 4, which depicts a method 410 in accordance with an embodiment of the present invention. When describing FIG. 4, reference might also be made to FIG. 2. For example, FIG. 4 is directed to determining a document score (e.g., 280), which suggests a relevance of a document (e.g., 220) to a search query (e.g., 216). An embodiment of the present invention includes computer-readable media (e.g., 230a-c) having computer-executable instructions embodied thereon that, when executed, perform the method depicted by FIG. 4.

Step 412 of method 410 includes receiving the search query comprising terms that represent a first subject and a second subject. For example, search-query receiver 226 receives search query 216 that is comprised of the subject "las vegas" and the subject "house for rent," such that "las vegas" is an exemplary first subject and "house for rent" is an exemplary second subject.

Method 410 includes at step 414 identifying a first equivalent subject that is semantically similar to the first subject and a second equivalent subject that is semantically similar to the second subject, wherein each pair of a subject and an equivalent subject comprises a respective subject group. For example, "vegas" is a first equivalent subject that is semantically similar to the first subject "las vegas," and "rental houses" is a second equivalent subject that is semantically similar to the second subject "house for rent." The pair of "las vegas" and "vegas" makes up a subject group, and the pair of "house for rent" and "rental houses" makes up a different subject group.

Step 416 includes determining a first-subject-group frequency (e.g., 2X+3Y) comprised of both a first-subject frequency (e.g., the value 2 under column 272) and a first-equivalent-subject frequency (e.g., the value 3 under column 272). The first-subject frequency includes a number of times the first subject (e.g., las vegas) is found in the document (e.g., document 220), and the first-equivalent-subject frequency includes a number of times the first equivalent subject (e.g., vegas) is found in the document (e.g., document 220).

Step 418 includes determining a second-subject-group frequency (e.g., 2W+2Z) comprised of both a second-subject frequency (e.g., the value 2 under column 272) and a second-equivalent-subject frequency (e.g., the value 2 under column 272). The second-subject frequency includes a number of times the second subject (e.g., house for rent) is found in the document (e.g., document 220), and the second-equivalent-subject frequency includes a number of times the second equivalent subject (e.g., homes for rent) is found in the document (e.g., document 220).

Step 420 includes calculating the document score of the document. The document score is comprised of a first-subject-group score and a second-subject-group score, and each subject-group score is calculated by applying a saturation function to a respective subject-group frequency. For example, a subject-group score (e.g., 276) is calculated by dividing (2X+3Y) by (2X+3Y+K).

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and might be employed without reference to other features and subcombinations and are contemplated within the scope of the claims.

The invention claimed is:

1. A computer-storage medium storing computer-executable instructions that, when executed, perform a method of determining a document score, which suggests a relevance of a document to a search query, the method comprising:
   receiving the search query;
   parsing the search query into a first n-gram having a first weight and a second n-gram having a second weight, wherein the first weight quantifies an importance of the first n-gram to the search query and the second weight quantifies an importance of the second n-gram to the search query;
   determining that the first weight and the second weight satisfy a threshold weight criterion, wherein an n-gram is not used to determine the document score when a weight of the n-gram does not satisfy the threshold weight criterion;
   identifying a first equivalent subject that is semantically similar to the first n-gram and a second equivalent subject that is semantically similar to the second n-gram, wherein the first n-gram and the first equivalent subject comprise a first subject group and the second g-gram and the second equivalent subject comprise a second subject group; and
   determining the document score of the document,
      wherein the document score is comprised of a first subject-group score and a second subject-group score, and
      wherein both subject-group scores are calculated using both a subject frequency, which includes a number of times a respective n-gram is found in the document, and an equivalent-subject frequency, which includes a number of times a respective equivalent-subject is found in the document.

2. The computer-storage medium of claim 1, wherein the first weight is a function of both a frequency of each term of the first n-gram in a corpus and a frequency of the first n-gram in the corpus.

3. The computer-storage medium of claim 1, wherein the second weight is reduced when the second n-gram is deemed part of a larger n-gram.

4. The computer-storage medium of claim 1, wherein identifying the equivalent subject includes referencing an equivalent-subject datastore, which maintains a listing of equivalent subjects that have been identified as semantically similar to the subject.

5. The computer-storage medium of claim 1, wherein, when calculating the subject-group score, the equivalent-subject frequency is weighted based on a confidence that the equivalent subject is semantically similar to the subject.

6. The computer-storage medium of claim 1,
   wherein the subject-group score is calculated by applying a saturation function to a subject-group frequency, and
   wherein the subject-group frequency includes both the subject frequency and the equivalent-subject frequency.

7. The computer-storage medium of claim 6, wherein the subject frequency and the equivalent subject frequency are weighted.

8. The computer-storage medium of claim 6, wherein the saturation function includes a sum of a customizable parameter and the subject-group frequency.

9. The computer-storage medium of claim 1, wherein the document score is calculated using a plurality of subject-group scores that correspond to a plurality of subjects included in the search query.

10. The computer-storage medium of claim 1, wherein the document score of the document is comprised of a sum of the plurality of subject-group scores.

11. A method of determining a document score, which suggests a relevance of a document to a search query, the method comprising:
   receiving the search query;
   parsing the search query into a plurality of n-grams including a first n-gram, which includes a first weight quantifying an importance of the first n-gram to the search query;
   determining that the first weight satisfies a threshold weight criterion;
   identifying a first equivalent subject that is semantically similar to the first n-gram and that forms a subject group with the first n-gram, wherein the first equivalent subject is associated with an equivalent-subject score quantifying a confidence that the first equivalent subject and the first n-gram identify a same subject;
   determining a first-subject-group frequency comprised of both a first-subject frequency, which includes a number of times the first n-gram is found in the document, and a first-equivalent-subject frequency, which includes a number of times the first equivalent subject is found in the document; and
   calculating the document score of the document,
      wherein the document score is comprised of a first-subject-group score, and
      wherein the first-subject-group score is calculated by combining the first-equivalent-subject frequency with the equivalent-subject score, such that the first-equivalent-subject frequency is weighted based on a confidence that the first equivalent subject is semantically similar to the first n-gram.

12. The method of claim 11, wherein the first-subject frequency and the first-equivalent-subject frequency are weighted based on respective locations within the document at which the first n-gram subject and first-equivalent subject are found.

13. The method of claim 11, wherein identifying an equivalent subject includes referencing an equivalent-subject datastore, which maintains a listing of equivalent subjects that have been identified as semantically similar to the first subject and the second subject.

14. The method of claim 11, wherein the method further comprises determining a second-subject-grouping score of another n-gram parsed from the search query, and wherein the document score is calculated by adding the first-subject-grouping score and the second-subject-grouping score.

15. A computer system that determines a document score, which suggests a relevance of a document to a search query, the computer system including a processor coupled to computer-storage media, which includes computer-readable instructions executed by the processor to provide:
   a search-query receiver that receives the search query
   a subject identifier that leverages the processor to parse the search query into a plurality of n-grams including a first n-gram, wherein the first n-gram includes a weight that quantifies a relevance of the first n-gram to the search query and that is deemed to satisfy a threshold weight criterion;
   an equivalent-subject identifier that references an equivalent-subject datastore to identify an equivalent subject, which is semantically similar to the n-gram, wherein the n-gram and the equivalent subject comprise a subject group and wherein the equivalent subject includes an equivalent-subject score quantifying a confidence that the equivalent subject and the first n-gram identify a same subject; and
   a document ranker that leverages the processor to calculate the document score of the document by;
      (1) determining a subject frequency, which includes a number of times the subject is found in the document, and an equivalent-subject frequency, which includes a number of times the equivalent subject is found in the document, and
      (2) calculating a weighted equivalent-subject frequency by multiplying the equivalent-subject frequency by the equivalent-subject score.

16. The computer system of claim 15,
   wherein calculating the document score further comprises calculating a subject-group score; and
   wherein the document ranker calculates the subject-group score by calculating a sum of the weighted equivalent-subject frequency and a weighted subject frequency, which is weighted based on a location of the n-gram in the document.

* * * * *